United States Patent [19]
Nakamura et al.

[11] Patent Number: 6,088,203
[45] Date of Patent: Jul. 11, 2000

[54] THREE POSITION MAGNETIC HEAD VERTICAL MOVEMENT DEVICE

[75] Inventors: Tadami Nakamura, Saitama; Toshihiro Kusunoki, Tokyo; Kazuhito Kurita, Kanagawa; Kiyoshi Toda, Saitama, all of Japan

[73] Assignee: Sony Corporation, Tokyo, Japan

[21] Appl. No.: 09/029,915

[22] PCT Filed: Jul. 11, 1997

[86] PCT No.: PCT/JP97/02423

§ 371 Date: Jun. 8, 1998

§ 102(e) Date: Jun. 8, 1998

[87] PCT Pub. No.: WO98/02882

PCT Pub. Date: Jan. 22, 1998

[30] Foreign Application Priority Data

Jul. 11, 1996 [JP] Japan ..................................... 8-182353

[51] Int. Cl.[7] ............................. G11B 5/54; G11B 11/10
[52] U.S. Cl. .......................................... 360/255.2; 369/13
[58] Field of Search ........................... 360/105; 369/75.1, 369/75.2, 77.1, 77.2

[56] References Cited

U.S. PATENT DOCUMENTS

| 5,299,185 | 3/1994 | Sakurai et al. | 369/75.2 |
|---|---|---|---|
| 5,557,589 | 9/1996 | Mukawa et al. | 369/13 |
| 5,648,943 | 7/1997 | Omi et al. | 369/13 |

FOREIGN PATENT DOCUMENTS

| 6-96490 | 4/1994 | Japan . |
|---|---|---|
| 6-251527 | 9/1994 | Japan . |
| 7-45025 | 2/1995 | Japan . |
| 8-203227 | 8/1996 | Japan . |
| 8-203228 | 8/1996 | Japan . |

*Primary Examiner*—George J. Letscher
*Attorney, Agent, or Firm*—Limbach & Limbach LLP

[57] ABSTRACT

A magnetic head vertical movement device for a magnetic-optical recording and/or reproducing apparatus for use with a disk cartridge, within which a magneto-optical disc is accommodated. The device includes a vertical movement drive mechanism for a magnetic head. The vertical movement drive mechanism carries out the vertical movement of the head between a first position where the magnetic head is caused to carry out the recording of information signals when the holder is located at a falling position, a second position above the first position, at which the head is located when the recording and/or reproduction unit is in a non-recording state, and a third position above the second position, at which the magnetic head is located when the holder is located at a rising position. The device avoids contact between the disk cartridge and the magnetic head at the time of insertion and withdrawal of the disk cartridge. The device also reduces the movement quantity of the magnetic head within a range between the position where recording is carried out and the position where the recording and/or reproducing apparatus is in the non-recording state in order to realize a magneto-optical recording and/or reproducing apparatus with a thin structure.

13 Claims, 6 Drawing Sheets

THREE POSITION MAGNETIC HEAD VERTICAL MOVEMENT DEVICE

TECHNICAL FIELD

This invention relates a magnetic head vertical movement device for a magneto-optical recording and/or reproducing apparatus using magneto-optical disc as recording medium, and more particularly to a magnetic head vertical movement device capable of moving the magnetic head so that it is placed (located) at a position caused to be further elevated as compared to the case where it is placed (located) at the non-recording position of information signals with respect to the recording medium.

BACKGROUND ART

Hitherto, there have been proposed magneto-optical recording/reproducing apparatuses adapted to selectively use, as a recording medium for information signals, the magneto-optical disc capable of carrying out overwrite recording of information signals and the reproduction only (type) optical disc.

The magneto-optical disc or the optical disc used for a magneto-optical recording/reproducing apparatus as described above is accommodated within the disc cartridge in order to prevent damage of at least the signal recording surface and/or attachment of dust thereto, and is loaded into the magneto-optical recording/reproducing apparatus in the state where it remains to be accommodated within the disc cartridge.

The magneto-optical recording/reproducing apparatus (unit) using the disc cartridge comprises holder for holding the disc cartridge, and is adapted so that this holder is rotated from the rising position for carrying out insertion or ejection of the disc cartridge toward the falling position side for carrying out recording and/or reproduction with respect to the magneto-optical disc within the disc cartridge, whereby the disc cartridge inserted and held within the holder is loaded into the recording/reproduction unit.

The recording/reproduction unit for carrying out recording and/or reproduction with respect to the magneto-optical disc within the disc cartridge comprises a magnetic head disposed above the holder and adapted to be rotated following rotation of the holder, and an optical head disposed at the position opposite to this magnetic head. Further, at the recording/reproduction unit, there is provided a cartridge loading section within which disc cartridge held within the holder is loaded after undergone positioning, and there is provided a disc rotational operation mechanism for allowing the magneto-optical disc or the optical disc accommodated within the disc cartridge loaded at the cartridge loading portion to undergo rotational operation.

In order to carry out recording of information signals such as music signal, etc. by the magneto-optical recording/reproducing unit constituted as described above, the disc cartridge within which the magneto-optical disc which permits overwrite recording of information signals is accommodated is held into the holder to rotate this holder toward the falling position side where recording and/or reproduction of information signals are carried out with respect to the magneto-optical disc to allow the disc cartridge to undergo loading with respect to the cartridge loading portion. When the disc cartridge is loaded with respect to the cartridge loading portion, the magneto-optical disc accommodated within the disc cartridge is clamped with respect to the disc rotational operation mechanism. At this stage, the disc rotational operation mechanism is driven to allow the magneto-optical disc to undergo rotational operation, and to allow the magnetic head and the optical head to undergo movement operation in the radial direction of the magneto-optical disc in a manner synchronous with each other. Then, light beams emitted from the optical head are irradiated onto the magneto-optical disc caused to experience rotational operation to heat the portion where light beams have been irradiated so that its temperature becomes equal to the Curie temperature or more, and to apply, to the heated portion, external magnetic field which has been magnetically modulated in accordance with information signal to be recorded from the magnetic head. Thus, recording of desired information signal is carried out.

Meanwhile, the magnetic head disposed above the holder and rotated along with the holder is caused to become close to the magneto-optical disc in a manner to slidably come into contact therewith when recording of information signals is carried out with respect to the magneto-optical disc.

Moreover, when reproduction of information signals recorded on the magneto-optical disc or the reproduction only type optical disc accommodated within the disc cartridge is carried out, since it is unnecessary to apply external magnetic field onto the magneto-optical disc or the optical disc, the magnetic head is moved to the position spaced from the magneto-optical disc or the optical disc. Also when the recording/reproduction unit is in stopped state where no recording of information signals is carried out, the magnetic head is moved to the position spaced from the magneto-optical disc.

When there is no necessity of using the magnetic head as described above, the magnetic head is moved to the position spaced from the magneto-optical disc, etc. in order to prevent abrasion of the magnetic head, or the magneto-optical disc or the optical disc.

Meanwhile, since the magneto-optical discs or the optical discs can carry out high density recording of information signals, discs of which diameter is caused to be small are used. For example, magneto-optical discs or optical discs of which diameter is caused to be about 64 mm are used. Magneto-optical recording/reproducing units themselves using such magneto-optical discs or optical discs which have been compact as recording medium are caused to become compact. Thus, magneto-optical recording/reproducing units which have been compact into portable size are proposed.

In the magneto-optical recording/reproducing units permitted to undergo carrying (caused to be portable) of this kind, realization of thinner thickness and more compact structure is required in order to improve convenience of portability.

Meanwhile, in order to realize thinner thickness structure of the magneto-optical recording/reproducing unit, it is conceivable to reduce movement quantity of the magnetic head which comes into contact with the magneto-optical disc caused to undergo rotational operation by the disc rotational operation mechanism or becomes away therefrom.

However, in magneto-optical recording/reproducing units in which the magnetic head is disposed above the holder for holding the disc cartridge, when the movement quantity of the magnetic head is simply reduced, a portion of the magnetic head is placed in the state close to the portion within the holder when the holder is rotated so that it is located (placed) at the position where insertion or ejection of the disc cartridge is carried out. For this reason, there is the possibility that when insertion/withdrawal of the disc cartridge is carried out with respect to the holder, a portion of the disc cartridge may come into contact with the magnetic head to damage the magnetic head.

In addition, when the holder and the magnetic head are close to each other, there is also the possibility that in such cases that impact is applied to the magneto-optical recording/reproducing unit, the magnetic head may come into contact with a portion of the disc cartridge so that it is damaged.

DISCLOSURE OF THE INVENTION

An object of this invention is to provide a novel magnetic head vertical movement device for a magneto-optical recording/reproducing apparatus which has solved the problems that the conventional magneto-optical recording and/or reproducing apparatuses have.

Another object of this invention is to provide a magnetic head vertical movement device which can realize protection of the magnetic head and can realize thinner thickness structure of the magneto-optical recording and/or reproducing apparatus.

A further object of this invention is to provide a magnetic head vertical movement device for a magneto-optical recording and/or reproducing apparatus which can securely carry out insertion/withdrawal with respect to the holder of the disc cartridge within which magneto-optical disc is accommodated.

A still further object of this invention is to provide a vertical movement device for the head which permits the magnetic head to be securely close to magneto-optical disc when recording of information signals is carried out with respect to the magneto-optical disc.

A still more further object of this invention is to provide a magnetic head vertical movement device which can securely move the magnetic head so that it is located at the position corresponding to the operation mode of the magneto-optical recording and/or reproducing apparatus.

A magnetic head vertical movement device for a magneto-optical recording and/or reproducing apparatus proposed in order to attain objects as described above comprises a holder for holding a recording medium such as a magneto-optical disc or an optical disc, a recording and/or reproduction unit provided with a magnetic head and an optical head, and a vertical movement drive mechanism for allowing the magnetic head to undergo vertical movement operation.

In this case, the holder is moved between rising position where insertion or ejection of the recording medium is carried out and falling position where recording and/or reproduction are carried out with respect to the recording medium. Moreover, the magnetic head constituting the recording and/or reproduction unit is disposed above the holder, and the optical head is disposed at the position opposite to the magnetic head. Further, vertical movement drive mechanism for the magnetic head is adapted for moving the magnetic head within the range between a first position where the magnetic head is caused to carry out recording of information signals with respect to the recording medium along with the optical head when the holder is located at falling position and a second position above the first position, at which the magnetic head is located when (operation mode of) the recording and/or reproduction unit is in a non-recording state with respect to the recording medium, and further moves the magnetic head to a third position above the second position, at which the magnetic head is positioned when the holder is located at the rising position.

Particularly, the vertical movement drive mechanism is adapted so that when the recording and/or reproduction unit is in stopped state or in reproduction state, it moves the magnetic head to the second position and when the holder is moved to the rising position, it moves the magnetic head to the third position.

The vertical movement drive mechanism of this magnetic head comprises a cam portion for moving the magnetic head to the first to third positions, and a drive portion for driving this cam portion to move the cam portion by the drive portion to thereby move the magnetic head to the first to third positions.

Moreover, the cam portion is provided at a vertical movement operation member slidably attached on the upper surface of the holder, and the drive portion comprises a slider adapted to be engaged with the vertical movement operation member.

Further, the holder for holding the recording medium comprises an opening portion into which the magnetic head is inserted, whereby the magnetic head is inserted into the holder by the vertical movement drive mechanism from the opening portion.

In this case, the first position where the magnetic head is caused to carry out recording of information signals with respect to the recording medium along with the optical head is the position where the magnetic head inserted from the opening portion of the holder is in contact with the recording medium, and the second position above the first position located when (operation mode of) the recording and/or reproducing unit is in non-recording state with respect to the recording medium is the position where the magnetic head is caused to be substantially flush with the upper surface of the holder.

Moreover, the magnetic head vertical movement device for the magneto-optical recording and/or reproducing apparatus according to this invention uses disc cartridge within which the magneto-optical disc is accommodated. This magnetic head vertical movement device comprises a holder for holding the disc cartridge to be inserted so that it is rotated between rising position where insertion or ejection of the disc cartridge is carried out and falling position where recording and/or reproduction are carried out with respect to the magneto-optical disc within the disc cartridge, a recording and/or reproduction unit including magnetic head disposed above the holder, and optical head disposed at the position opposite to the magnetic head, and a vertical movement drive mechanism for the magnetic head.

Further, the vertical movement drive mechanism of the magnetic head carries out vertical movement of the magnetic head within the range between a first position where the magnetic head is caused to carry out recording of information signals with respect to the magneto-optical disc along with the optical head when the holder is located at falling position, a second position above the first position, at which the magnetic head is located when (operation mode of) the recording and/or reproduction unit is placed in non-recording state with respect to the recording medium, and third position above the second position where the magnetic head is located when the holder is located at rising position.

This vertical movement drive mechanism comprises a movement member movably provided on the upper surface side of the holder to move the magnetic head to first to third positions, and a drive portion for driving this movement member to allow the movement member to undergo movement operation by the drive portion to thereby move the magnetic head to the first to third positions.

In addition, a stair-step shaped cam portion is provided at the movement member to move the magnetic head to the first, second and third positions in dependency upon the position with respect to this cam portion.

Further different objects of this invention and more practical merits obtained by this invention will become more clear from the description of the embodiments which will be given below.

BEST MODE FOR CARRYING OUT THE INVENTION

A magnetic head vertical movement device for a magneto-optical recording and/or reproducing apparatus according to this invention will now be described with reference to the attached drawings.

The magneto-optical recording/reproducing apparatus to which the magnetic head vertical movement device according to this invention is applied is adapted so that magneto-optical disc which permits overwrite recording of information signals and reproduction only type optical disc are selectively loaded as recording medium of information signals such as music signal, etc.

The magneto-optical disc or the optical disc used in this magneto-optical recording/reproducing apparatus is accommodated within the disc cartridge in order to prevent damage of at least the signal recording surface and/or attachment of dust thereto, and is loaded into the magneto-optical recording/reproducing apparatus in the state where it remains to be accommodated within the disc cartridge.

A disc cartridge 10 within which a magneto-optical disc 11 is accommodated and a disc cartridge 20 within which an optical disc 21 is accommodated, which are used in the magneto-optical recording/reproducing apparatus to which the magnetic head vertical movement device according to this invention is applied, will now be described.

Figure 1:
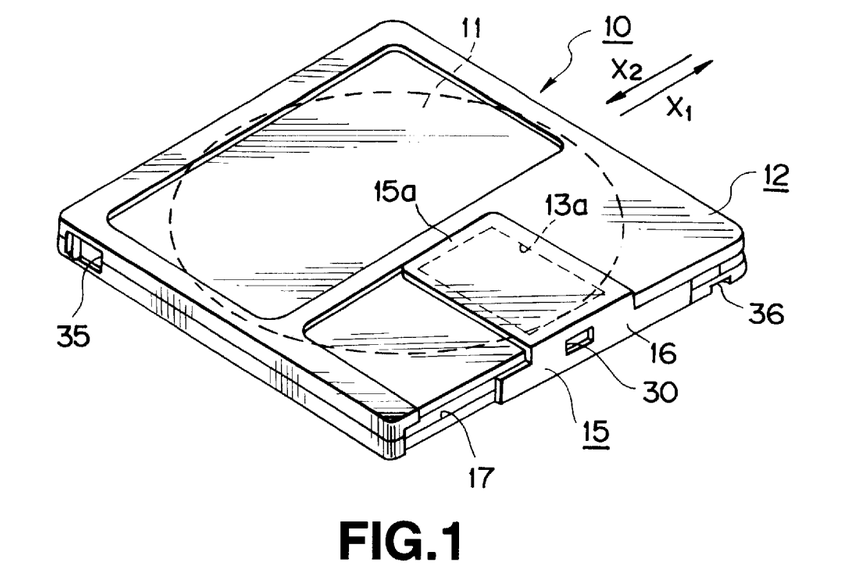
FIG. 1 is an appearance perspective view when viewed from the upper side of disc cartridge within which magneto-optical disc is accommodated, which is used in magneto-optical recording and/or reproducing apparatus to which magnetic head vertical movement device according to this invention is applied is accommodated.
Figure 2:
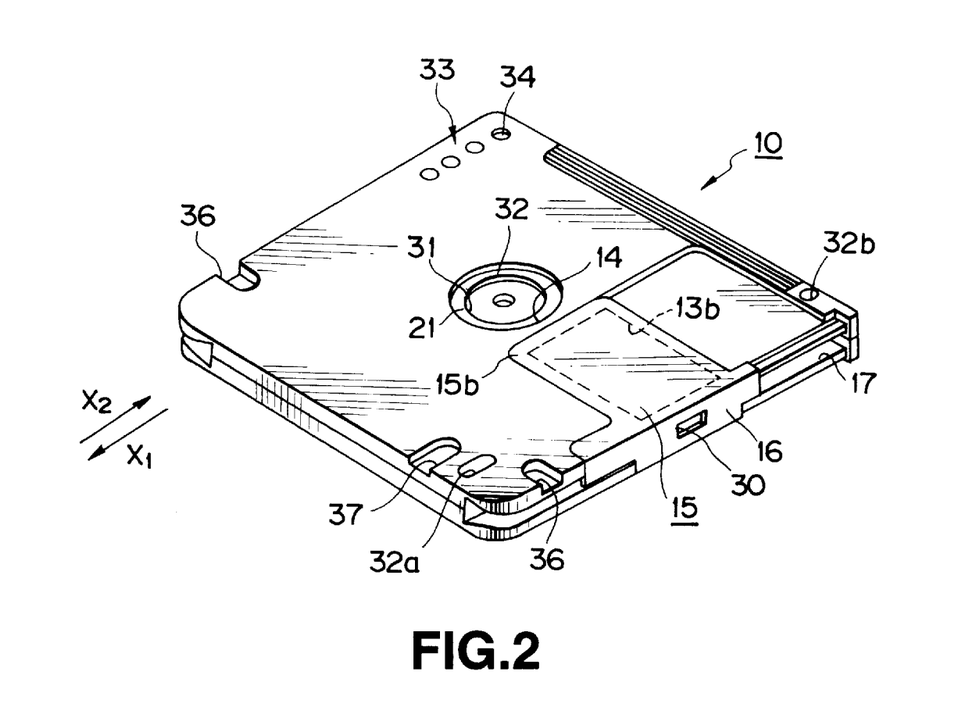
FIG. 2 is an appearance perspective view when viewed from the lower side of the disc cartridge.

The disc cartridge 10 within which the magneto-optical disc 11 which permits overwrite recording of information signals is accommodated comprises, as shown in FIGS. 1 and 2, a rectangular cartridge body 12 in which the outer (outside) diameter of the magneto-optical disc 11 is caused to be substantially inscribed circle. At the upper surface side of this cartridge body 12, there is formed, as shown in FIG. 1, an opening portion 13a for recording which allows a portion of the signal recording area of the accommodated magneto-optical disc 11 to be faced toward the external in a manner ranging between the inner circumference and the outer circumference. At the lower surface side of the cartridge body 12, there is formed, as shown in FIG. 2, an opening portion 13b for recording/reproduction which allows a portion of the signal recording area of the magneto-optical disc 11 to be similarly faced toward the external in a manner opposite to the recording opening portion 13a. Further, at the central portion of the lower surface side of the cartridge body 12, there is formed, as shown in FIG. 2, a circular central opening portion 14 into which disc table constituting the disc operation mechanism for rotationally operating the magneto-optical disc 11 is admitted.

Further, at the cartridge body 12 constituting the recording type disc cartridge 10, there is movably attached a shutter member 15 for opening or closing opening portions 13a, 13b for recording and/or reproduction provided on both upper and lower surfaces of this cartridge body 12. This shutter member 15 is composed of a pair of shutter plates 15a, 15b formed by punching and bending, e.g., thin metallic plate and respectively having sizes (dimensions) sufficient to cover the recording and/or reproduction opening portions 13a, 13b, and a connecting portion 16 which connects the bottom end portions of these shutter plates 15a, 15b, and is formed so as to take channel shape in cross section as a whole.

In this case, this shutter member 15 may be a member formed by injecting and molding synthetic resin.

The shutter member 15 constituted in this way is attached to the front side of the cartridge body 12 in such a manner that respective shutter plates 15a, 15b cover the recording and/or reproduction opening portions 13a, 13b, and is adapted so that it is moved along the front side to thereby open or close the respective opening portions 13a, 13b. The shutter member 15 is adapted so that engagement piece provided at the connecting portion 16 is engaged into a movement guide groove 17 formed at the front side of the cartridge body 12, whereby the engagement piece is guided by the movement guide groove 17 so that stable movement is guaranteed.

The disc cartridge 10 constituted in this way is inserted into the magneto-optical recording/reproducing apparatus (unit) with one side surface perpendicular to the front side where the shutter member 15 is moved being as insertion end. Namely, the disc cartridge 10 is caused to undergo insertion/withdrawal with respect to the magneto-optical recording/reproducing unit with direction indicated by arrow $X_1$ and direction indicated by arrow $X_2$ in FIGS. 1 and 2 being as insertion/withdrawal direction.

Meanwhile, the magneto-optical disc 11 accommodated within the recording type disc cartridge 10 is formed by depositing signal recording layer comprised of perpendicular magnetization film and depositing reflection layer formed by using metallic material such as aluminum, etc. on disc base (substrate) having diameter caused to be substantially 64 mm and formed by transparent synthetic resin material having light transmission property such as polycarbonate resin, etc. This signal recording layer is locally heated so that its temperature becomes equal to Curie temperature or more by light beams emitted from the light source of the optical pick-up device (unit) which is the optical head, and external magnetic field modulated in accordance with information signal to be recorded is applied to the heated portion. Thus, recording of information signals is carried out. Moreover, the information signal recorded on this magneto-optical disc 11 is read out by irradiating linearly polarized light beams onto the signal recording layer to detect, by light (photo-) detector, rotation of polarization direction by the Kerr effect of return light beams reflected from the signal recording layer.

Figure 3:
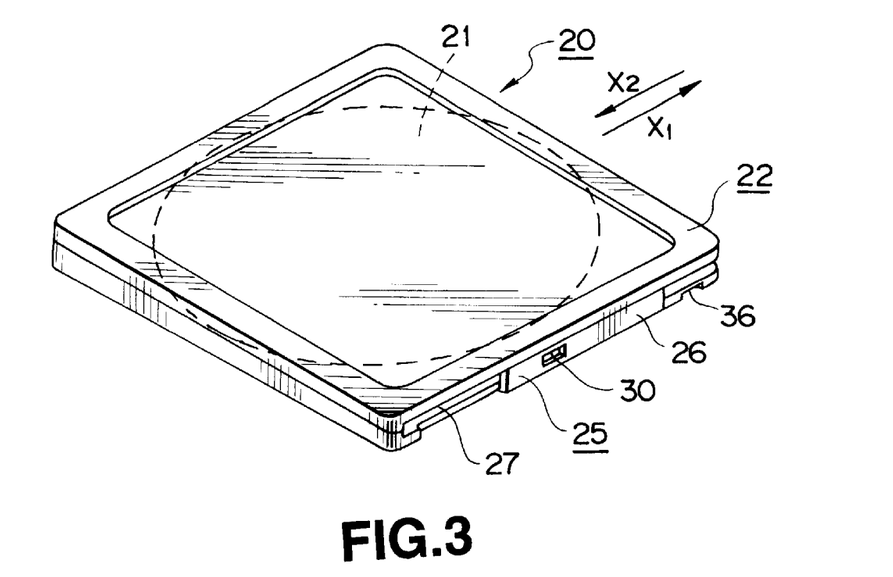
FIG. 3 is an appearance perspective view when viewed from the upper side of reproduction only type disc cartridge used in magneto-optical recording and/or reproducing apparatus to which the magnetic head vertical movement device according to this invention is applied.
Figure 4:
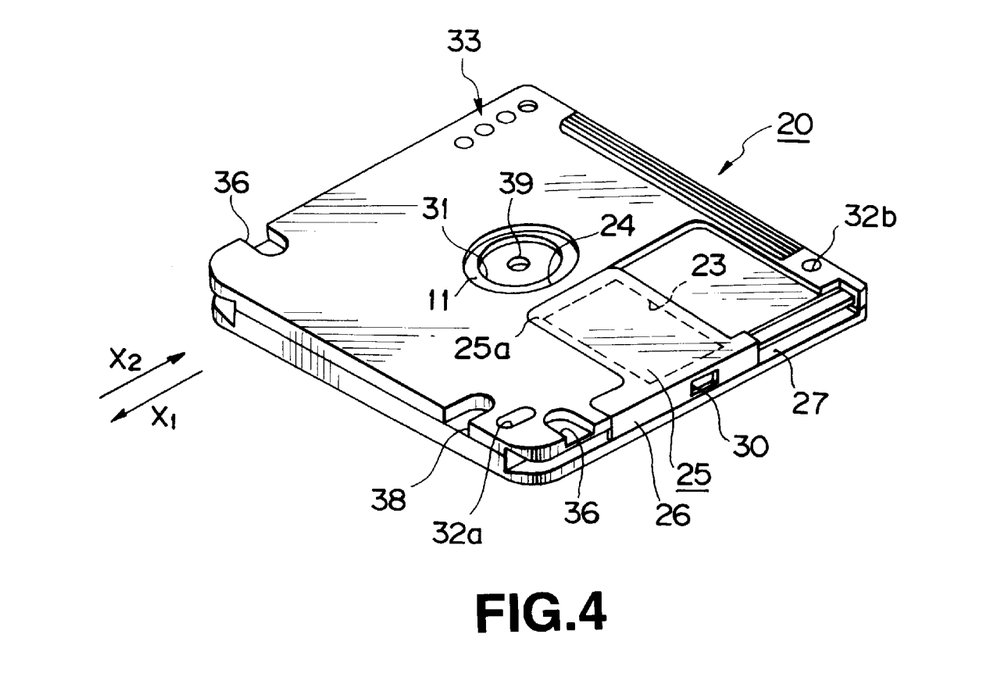
FIG. 4 is an appearance perspective view when viewed from the lower side of the reproduction only type disc cartridge.

On the other hand, the disc cartridge 21 within which the reproduction only type optical disc 21 is accommodated also comprises, as shown in FIGS. 3 and 4, similarly to the recording type disc cartridge 10, a rectangular cartridge body 22 in which the outer (outside) diameter of the optical disc 21 is caused to be substantially inscribed circle. Since this disc cartridge 20 is not required to oppose the magnetic head for recording information signals to the optical disc 21, the upper surface side of the cartridge body 22 is closed as shown in FIG. 3 so that it is caused to be flat plane in a manner different from the case where recording opening portion 13a is provided as in the recording type disc cartridge 10.

Further, at the lower surface side of the cartridge body 22, there is formed, as shown in FIG. 4, an opening portion 23 for reproduction in which a portion of the information signal recording area of the optical disc 21 is faced toward the external along inner and outer circumferential directions and optical pick-up device for irradiating light beams onto the optical disc 21 to carry out read-out operation of information signals recorded on the optical disc 21 is faced. In addition, at the central portion of the lower surface side of the cartridge body 22, there is formed, as shown in FIG. 4, a circular central opening portion 24 into which disc table constituting the disc operation mechanism which rotationally operates the optical disc 21 is admitted.

Also at this reproduction only type disc cartridge 20, there is attached a shutter member 25 for opening or closing the reproduction opening portion 23. This shutter member 25 includes a shutter plate 25a having size (dimensions) sufficient to close the reproduction opening portion 23, and is provided at the base end portion side of this shutter plate 25a with a supporting portion 26, which is channel-shaped in cross section, for allowing the shutter member 25 to be movably supported by the cartridge body 22. The shutter member 25 is attached in such a manner that a portion of the supporting portion 26 is engaged into a movement guide groove 27 formed at the front side of the cartridge body 22 to allow a portion of the cartridge body 22 to be put between the side wall portions of the supporting portion. This shutter member 25 is moved in the opening/closing direction at the reproduction opening portion 23 along the front side of the cartridge body 22 while being guided by the movement guide groove 27.

The reproduction only type disc cartridge 20 constituted in this way is inserted, similarly to the above-described recording type disc cartridge 10, into the magneto-optical recording/reproduction unit with one side surface perpendicular to the front side where the shutter member 25 is moved being as insertion end. Namely, the disc cartridge 20 is caused to undergo insertion/withdrawal with respect to the magneto-optical recording/reproducing unit with the direction indicated by arrow $X_1$ and the direction indicated by arrow $X_2$ in FIGS. 3 and 4 being as insertion/withdrawal direction.

Meanwhile, the optical disc 21 accommodated within the reproduction only type disc cartridge 20 includes, similarly to the magneto-optical disc 11, disc base (substrate) having diameter caused to be substantially 64 mm and formed by transparent synthetic resin material having light transmission property such as polycarbonate resin, etc., wherein pit trains comprised of very small uneven trains are formed at the disc base so that information signals are recorded in advance. At the surface side where the pit trains are formed of the disc base, there is deposited reflection layer constituted by metallic material such as aluminum, etc.

Information signals recorded on the reproduction only type optical disc 21 are read out by irradiating light beams emitted from the light source of the optical pick-up device (unit) onto the pit trains to detect return light beams reflected from the optical disc by light (photo-) detector.

Since the recording type and reproduction only type disc cartridges 10, 20 are loaded into the common magneto-optical recording/reproducing unit, the configuration required for loading these disc cartridges 10, 20 is commonly provided.

At the central portions of the connecting portion 16 of the shutter member 15 attached to the recording type disc cartridge 10 and the supporting portion 26 of the shutter member 25 attached to the reproduction only type disc cartridge 20, there are respectively provided engagement holes 30 with which there is engaged holding member provided at the unit side adapted so that when these disc cartridges 10, 20 are loaded into the magneto-optical recording/reproducing unit, the engagement holes 30 hold the shutter members 15, 25 at respective opening positions, and when the disc cartridges 10, 20 are caused to undergo eject operation, these holes 30 hold the shutter members 15, 25 in such a manner to relatively move them with respect to the cartridge bodies 12, 22.

Meanwhile, at the central portions of the magneto-optical disc 11 and the optical disc 21 accommodated within the respective disc cartridges 10, 20, center holes 31 are respectively formed and hubs 32, 39 for allowing respective discs to be clamped with respect to the disc rotational operation mechanism of the recording/reproduction unit side in such a manner to close these respective center holes 31. These hubs 32, 39 are formed by metallic material having magnetism which can be attracted by magnet disposed on the disc table constituting the disc rotational operation mechanism. The center holes 31 and the hubs 32, 39 are faced toward the external from central opening portions 14, 24 for the disc table of the cartridge bodies 12, 22.

Moreover, at the lower surface side of the cartridge bodies 12, 22 of the disc cartridges 10, 20, there are formed a pair of positioning holes 32a, 32b with which positioning pins provided at the cartridge loading portion are engaged when these disc cartridges 10, 20 are loaded with respect to the cartridge loading portion within the magneto-optical recording/reproducing unit. As shown in FIGS. 2 and 4, these positioning holes 32a, 32b are provided in a manner positioned on the both sides of the front side where the shutter members 15, 25 are attached of the cartridge bodies 12, 22. In this example, one positioning hole 32a is formed in such a manner that movement direction of the shutter members 15, 25 is caused to be length direction, and is adapted so that the engagement position with respect to positioning pin can be adjusted within the range of the length direction. In addition, the other positioning hole 32b is formed so as to take complete round shape, and serves to limit the engagement position with respect to the positioning pin.

Further, at the lower surface side of the cartridge bodies 12, 22, there are formed plural discrimination holes 33 in a manner positioned at rear (face) side opposite to the front side where positioning holes 32a, 32b are provided as shown in FIGS. 2 and 4. These discrimination holes 33 serve to indicate kind or state of discs respectively accommodated within the cartridge bodies 12, 22, e.g., whether or not recording of information signals can be made. Further, one discrimination hole 34 provided at the recording type disc cartridge 10 is used as discrimination hole for erroneous recording detection, and is opened or closed by an erroneous recording prevention member 35 as shown in FIG. 1 movably provided within the cartridge bodies 12, 22. Namely, the discrimination hole 34 is adapted so that the erroneous recording prevention member 35 is caused to undergo movement operation to thereby switch whether or not recording of information signals with respect to the magneto-optical disc 11 can be made. In addition, at the cartridge bodies 12, 22, there are respectively formed engagement recessed portions 36 with which, e.g., a portion of drawing mechanism provided at the disc exchange unit is engaged in a manner positioned on the both sides of one side surface serving as insertion end into the magneto-optical recording/reproducing unit.

Moreover, at the respective cartridge bodies 12, 22, there are respectively formed, as shown in FIGS. 2 and 4, a magneto-optical disc discrimination recessed portion 37 and an optical disc discrimination recessed portion 38 indicating whether corresponding one of these disc cartridges 10, 20 is of the recording type or of the reproduction only type. These discrimination recessed portions 37, 38 are provided in a manner positioned at the insertion end side into the magneto-optical recording/reproducing unit of the lower surface side of the cartridge bodies 12, 22. In this example, the respective discrimination recessed portions 37, 38 are formed so that their depths are different from each other, and serve to indicate, by this difference between thicknesses, whether corresponding one of the respective disc cartridges 10, 20 is of the recording type or the reproduction only type.

The magneto-optical recording/reproducing apparatus (unit) to which the magnetic head vertical movement device according to the invention using either the disc cartridge 10 of the recording type or the disc cartridge 20 of the reproduction only type constituted as described above is applied will now be described.

Figure 5:
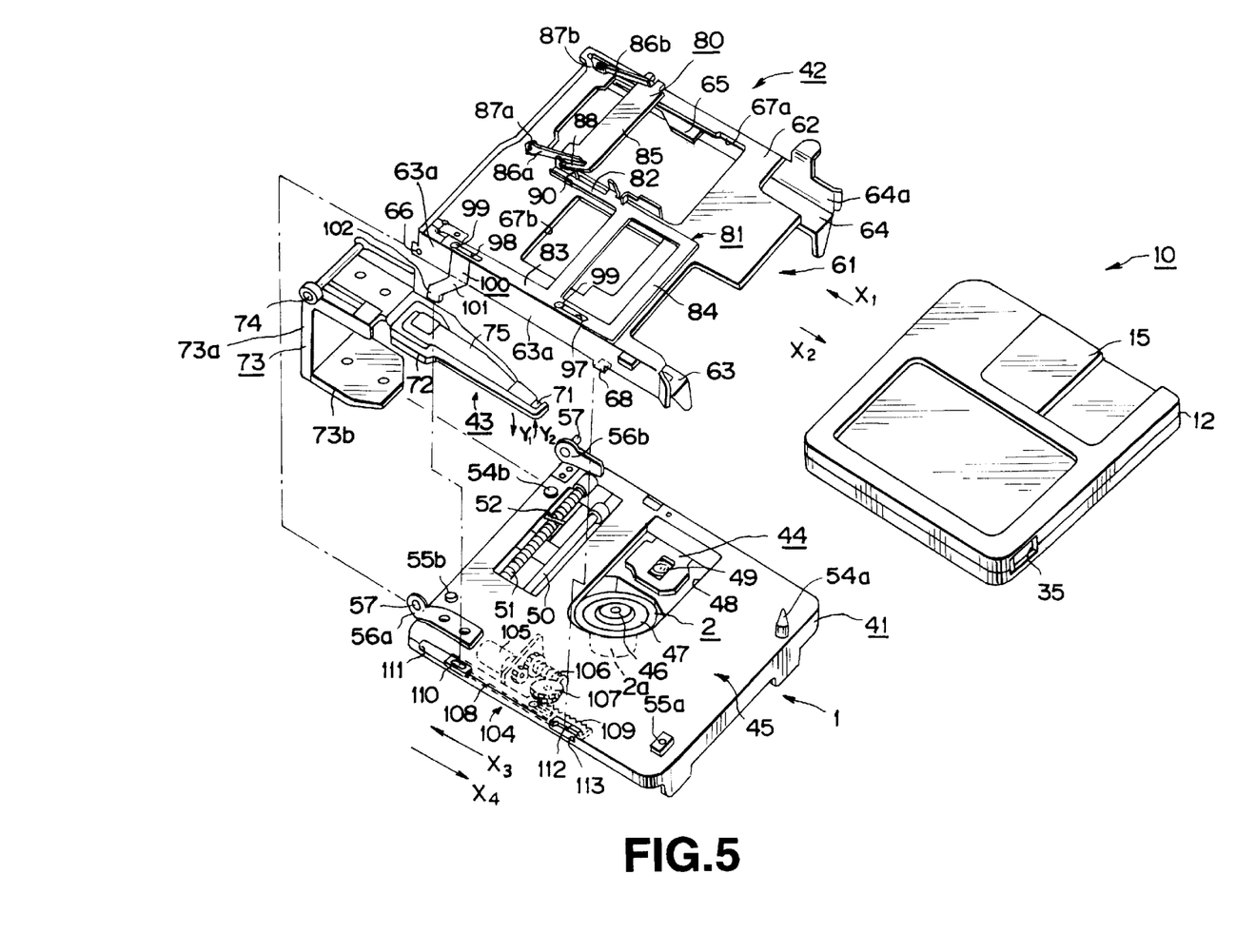
FIG. 5 is an exploded perspective view showing magneto-optical recording and/or reproducing apparatus to which the magnetic head vertical movement device according to this invention is applied.

This magneto-optical recording/reproducing unit is caused to become compact so that its size is reduced to the portable size, and comprises a base 41 in rectangular flat plate form formed by metallic material, which is disposed within casing (not shown) constituting the unit body. At this base 41, as shown in FIG. 5, a holder 42 adapted so that disc cartridge 10 or 20 is inserted thereinto and is held therewithin is rotatably supported, a magnetic head unit 43 and an optical pick-up unit 44 which constitute a recording/reproduction unit 1 is assembled, and a disc rotational operation mechanism 2 for rotationally operating the magneto-optical disc 11 or the optical disc 21 accommodated within the disc cartridge 10 or 20 held by the holder 42 is assembled.

Further, on the base 41 at which the recording/reproduction unit 1 is assembled, there is constituted a cartridge loading portion 45 into which disc cartridge 10 or 20 held by the holder 42 is loaded after undergone positioning. On the base 41 at which this cartridge loading portion 45 is constituted, there are vertically provided, as shown in FIG. 5, a pair of positioning pins 54a, 54b for carrying out positioning in the horizontal direction of the disc cartridge 10, 20 and a pair of positioning projections 55a, 55b for carrying out positioning in height direction thereof when the disc cartridge 10 or 20 held by the holder 42 is loaded with respect to the cartridge loading portion 45. The pair of positioning pins 54a, 54b are respectively engaged into positioning holes 32a, 32b provided at the disc cartridges 10, 20 when the disc cartridge 10 or 20 is loaded with respect to the cartridge loading portion 45 to carry out positioning in the horizontal direction in parallel to the plane of the base 41. In addition, the pair of positioning projections 55a, 55b are adapted so that when the disc cartridge 10 or 20 is loaded with respect to the cartridge loading portion 45, they support the bottom surface of the disc cartridge 10 or 20 to carry out positioning in the height direction.

In this example, at one positioning projection 55a, there is provided detection switch adapted so that when the disc cartridge 10 or 20 is loaded with respect to the cartridge loading portion 45, the detection switch is caused to undergo pressing operation by the disc cartridge 10 or 20 to detect loading with respect to the cartridge loading portion 45 of the disc cartridge 10 or 20. In addition, on the base 41, although not shown, there is provided cartridge discrimination switch for detecting kind of the disc cartridge 10 or 20 loaded with respect to the cartridge loading portion 45.

At the casing within which there is accommodated the base 41 on which the recording/reproduction unit 1 is assembled and the holder 42 is rotatably supported as described above, there is rotatably attached, although not shown, cover body rotated in synchronism with the holder 42 to open or close the opening portion side of the casing to which the upper surface of the base 41 is faced.

Further, at the casing, there are provided operation buttons such as power switching button and mode select button for selecting the operation mode of the recording/reproduction unit 1, etc. Moreover, at the cover body, there is provided display section for displaying management information such as address information, etc. of information signals that the recording/reproduction unit 1 is reproducing. In addition, within the casing, there is disposed electronic circuit board on which control circuit for controlling the recording/reproduction unit 1 in dependency upon control signal inputted by operation of operation button and/or display control circuit for controlling display of the display section in dependency upon such control signal are provided. This electronic circuit board is disposed at the lower surface side of the base 41.

Further, a disc rotational operation mechanism 2 for rotationally operating the magneto-optical disc 11 or the optical disc 21 accommodated within the disc cartridge 10 or 20 loaded with respect to the cartridge loading portion 45 comprises a spindle motor 2a and a disc table 47 rotationally driven by this spindle motor 2a. As shown in FIG. 5, the spindle motor 2a is attached on the lower surface side of the base 41 in such a manner that a drive shaft 46 is projected toward the cartridge loading portion 45 side. The disc table 47 formed so as to take substantially disc shape is attached, in the state positioned at the cartridge loading portion 45 side, at the front end side of the drive shaft 46 so that it can be rotated in one body with the drive shaft 46. At this disc table 47, there is disposed magnet for magnetically attracting hubs 39 respectively provided at the magneto-optical disc 11 and the optical disc 21. Further, at the central portion thereof, there is provided centering portion in which the circumferential surface engaged into center holes 39 of the magneto-optical disc 11 and the optical disc 21 is caused to be inclined surface. The magneto-optical disc 11 or the optical disc 21 mounted on the disc table 47 is loaded in such a manner that the center hole 31 is engaged with the centering portion so that the hub 32 or 39 is magnetically attracted by the magnet to thereby allow the center of rotation to be in correspondence with the center of the disc table 47 so that the disc is rotated in one body with the disc table 47. The magneto-optical disc 11 or the optical disc 21 loaded on the disc table 47 is rotationally driven in one body with the disc table 47 when the spindle motor 2a is driven.

Moreover, on the base 41, there is attached an optical pick-up unit 44 constituting the optical head of the recording/reproduction unit 1 so that it can be moved along the radial direction of the magneto-optical disc 11 or the optical disc 21 loaded on the disc table 47. This optical pick-up unit 44 comprises an optical block including therewithin light source such as semiconductor laser for emitting light beams irradiated onto the magneto-optical disc 11 or the optical disc 21 on the disc table 47 and including therewithin optical parts for guiding light beams emitted from the light source to an object lens (objective) 49 for converging those light beams to irradiate them onto the magneto-optical disc 11 or the optical disc 21 and light (photo-) detector for detecting return light beams reflected from the magneto-optical disc 11 or the optical disc 21, and a biaxial actuator for allowing the object lens 49 to undergo drive displacement in the focusing direction of the direction in parallel to the optical axis of the object lens 49 and in the tracking direction of the plane direction perpendicular to the optical axis of the object lens 49 on the basis of focus error signal and tracking error signal.

Further, the optical pick-up unit 44 is movably supported in the radial direction of the magneto-optical disc 11 or the optical disc 21 on the disc table 47 through a guide shaft 50 and a guide portion which are disposed in parallel to each other at the lower surface side of the base 41, and is attached in the state where an engagement pin 52 is engaged with a feed screw 51 rotationally driven by feed motor. At this time, the optical pick-up unit 44 is adapted as shown in FIG. 5 so that the object lens 49 is opposed to the magneto-optical disc 11 or the optical disc 21 on the disc table 47 through an opening portion 48 formed at the base 41.

The optical pick-up unit 44 is adapted so that when the feed motor is driven and the feed screw 51 is rotationally driven, it is caused to undergo feed operation in the radial direction of the magneto-optical disc 11 or the optical disc 21 on the disc table 47 while being guided by the guide shaft 50 and the guide portion to scan the signal recording area of the magneto-optical disc 11 or the optical disc 21 by light beams emitted through the object lens 49.

In this example, at the base 41, there is provided detection switch caused to undergo pressing operation by the optical pick-up unit 44 when the optical pick-up unit 44 is moved to the innermost circumferential position of the magneto-optical disc 11 or the optical disc 21. This detection switch is caused to undergo pressing operation by the optical pick-up unit 44 to thereby detect that the optical pick-up unit 44 has been moved to the innermost circumferential position of the magneto-optical disc 11 or the optical disc 21 to once stop drive of the feed motor.

To the optical pick-up unit 44, there is connected a magnetic head unit 43 constituting the recording/reproduction unit 1 so that it is caused to undergo feed operation in the radial direction of the magneto-optical disc 11 or the optical disc 21 on the disc table 47 in synchronism with this optical pick-up unit 44. This magnetic head unit 43 comprises a magnetic head 71 for applying external magnetic field modulated in accordance with information signal to be recorded onto the magneto-optical disc 11, and a magnetic head supporting plate 72 provided with an elastically displaceable leaf spring 75 which has supported this magnetic head 71 at the front end side thereof.

The magnetic head unit 43 is connected to the optical pick-up unit 44 through a connecting member 73 so that the magnetic head 71 is located at the position opposite to the optical pick-up unit 44 with the magneto-optical disc 11 or the optical disc 21 on the disc table 47 being put between the magnetic head 71 and the optical pick-up unit 44.

As shown in FIG. 5, the connecting member 73 is composed of a connecting piece 73a, and an attachment piece 73b to the optical pick-up unit 44, which is formed by bending one end portion side of the connecting piece 73a in a direction perpendicular to the connecting piece 73a, and is formed substantially L-shaped as a whole. This connecting member 73 is attached to the optical pick-up unit 44 in the state where the attachment (connecting) piece 73a is fixed with respect to the optical block portion by using fixing screw, etc. in such a manner that the front end side of the connecting piece 73a is projected on the base 41. At the other end side of the connecting piece 73a, the base end portion of the magnetic head supporting plate 72 is rotatably supported through a support shaft 74. The magnetic head supporting plate 72 is rotated, with the support shaft 74 being as center, in the direction indicated by arrow $Y_1$ and in the direction indicated by arrow $Y_2$ in FIG. 5 of the directions in which the magnetic head 71 supported at the front end portion is close to the magneto-optical disc 11 or the optical disc 21 on the disc table 47, or is away therefrom. Additionally, the magnetic head supporting plate 72 undergoes biasing force of the leaf spring 75 so that it is rotationally biased in the direction in which it becomes close to the holder 42 of the direction indicated by arrow $Y_2$ in FIG. 5.

The magnetic head unit 43 connected to the optical pick-up unit 44 through the connecting member 73 in this way is adapted so that when the optical pick-up unit 44 is caused to undergo feed operation in the radial direction of the magneto-optical disc 11 or the optical disc 21 by feed motor, the magnetic head unit 43 is caused to undergo feed operation in the radial direction of the magneto-optical disc 11 or the optical disc 21 in one body with this optical pick-up unit 44.

Further, at the base 41, there is rotatably attached holder 42 adapted so that disc cartridge 10 or 20 is inserted thereinto and is held therewithin in the state positioned between the cartridge loading portion 45 and the magnetic head unit 43.

This holder 42 is formed by using thin metallic plate and includes a top plate 62 formed so as to take rectangular shape, which has size (dimensions) substantially equal to that of disc cartridges 10, 20 in plane (flat) surface form, wherein there are formed a pair of cartridge supporting portions 63, 64 formed L-shaped, which support the both sides of the disc cartridge 10 or 20 inserted with respect to both sides opposite to each other of the top plate 62, and the front side between these cartridge supporting portions 63, 64 is caused to be a cartridge insertion/withdrawal hole 61.

The holder 42 is adapted so that the both sides of the base end portion side opposite to the front side where the cartridge insertion/withdrawal hole 61 is formed are rotatably supported, through support shafts 57, with respect to a pair of supporting members 56a, 56b attached to the base 41. Namely, the holder 42 is attached in such a manner that the support shafts 57 provided in projected manner (hereinafter simply referred to as "projected" as occasion may demand) at the side surfaces of the supporting members 56a, 56b are inserted through pivotal holes 66 bored at the base end portions of side wall portions 63a, 64a constituting the cartridge supporting portions 63, 64.

Further, the holder 42 is rotated, with the support shafts 57 being as center, within the range between the position where the holder is fallen down to the cartridge loading portion 45 side where recording and/or reproduction of information signals are carried out with respect to the magneto-optical disc 11 or the optical disc 21 and rising position where insertion or ejection of the disc cartridge 10 or 20 is carried out. Moreover, at the lower side edge of one cartridge supporting portion 63 of the holder 42, as shown in FIG. 5, there is formed a lock piece 68 such that when the holder 42 is rotated so that it is located at the position where it is fallen down to the cartridge loading portion 45 side, the lock piece 68 is held by a holding piece 112 provided at a slide lever 108 constituting a vertical movement drive mechanism 104 which allows the magnetic head unit 43 to undergo vertical movement operation to lock the holder 42 at the falling position.

Further, at the middle portion of the side wall portion 64b constituting one cartridge supporting portion 63 of the holder 42, a shutter opening piece 65 is projected toward the internal of the holder 42. The shutter opening piece 65 is adapted so that when the disc cartridge 10 or 20 is inserted into this holder 42, the shutter opening piece 65 is admitted into movement guide groove 17 or 27 provided at the front side of the cartridge body 12 or 22 to come into contact with the connecting portion 16 or the supporting portion 26 of the shutter member 15 or 25 to relatively move the shutter member 15 or 25 with respect to the cartridge body 12 or 22 inserted into the holder 42 to open respective opening portions 13a, 13b or 23 provided at the cartridge body 12 or 22.

Further, at the top plate 62 of the holder 42, first and second window portions 67a, 67b in rectangular form are formed. To the first window portion 67a, the magnetic head 71 of the magnetic head unit 43 extended above the top plate 62 of the holder 42 is faced in a manner opposite to the magneto-optical disc 11 or the optical disc 21 on the disc table 47.

The holder 42 supported on the base 41 as described above is rotated with the support shafts 57 being as center. When the holder 42 is rotated so that it is located at the rising position spaced from the cartridge loading portion 45, the cartridge insertion/withdrawal hole 61 is faced toward the external of the unit body. Thus, insertion of the disc cartridge 10 or 20 is permitted through this cartridge insertion/withdrawal hole 61. Moreover, eject operation of the disc cartridge 10 or 20 held within the holder 42 is carried out. Further, when the holder 42 is rotated, with the support shafts 57 being as center, so that it is located at the falling position of the cartridge loading portion 45 side, the disc cartridge 10 or 20 held within the holder 42 is loaded with respect to the cartridge loading portion 45 after undergone positioning. Thus, the magneto-optical disc 11 or the optical disc 21 accommodated within the disc cartridge 10 or 20 is clamped in rotatable state in one body with the disc table 47 of the disc rotational operation mechanism 2, resulting in the state where recording and/or reproduction of information signals can be made with respect to the magneto-optical disc 11 or the optical disc 21.

In addition, the magnetic head unit 43 extended toward the upper side of the holder 42 is rotated following rotation of the holder 42.

Meanwhile, the magnetic head unit 43 extended toward the upper side of the holder 42 becomes closest to the magneto-optical disc 11 on the disc table 47 in a manner to substantially come into contact therewith when the holder 42 is rotated so that it is located at the falling position to undergo vertical movement operation between the first position at which the operation is in the recording mode where the magnetic head unit 43 carries out recording of information signals out with respect to the magneto-optical disc 11 along with the optical pick-up unit 44 and the second position which is the position of the upper side relative to the first position and at which the (operation mode of) the recording and/or reproduction unit is in the non-recording state of information signals with respect to the magneto-optical disc 11, i.e., in the reproduction mode where reproduction of information signals recorded on the magneto-optical disc 11 or the optical disc 21 is carried out or in the stopped state. Further, the magnetic head unit 43 is caused to undergo vertical movement operation within the range between the above-described second position which is the rising position where the holder 42 is spaced from the cartridge loading portion 45 and is the position located when the holder 42 is rotated at the position where insertion or ejection of the disc cartridge 10 or 20 is carried out, and third position located at further above the holder 42 relative to the second position.

The vertical movement operation ranging between the first position, the second position and the third position of the magnetic head unit 43 is carried out by a vertical movement drive mechanism 104 as described below. This vertical movement drive mechanism 104 comprises a vertical movement operation plate 80 rotatably supported at the upper surface side of the top plate 62 of the holder 42 in a manner positioned at the lower surface side of the magnetic head unit 43 extended above the top plate 62 of the holder 42 to allow the magnetic head supporting plate 72 to undergo rotational operation with the support shaft 74 being as center to thereby carry out vertical movement of the magnetic head 71 within the range between the first position, the second position and the third position, and a rotational operation plate 81 in which a cam portion 90 for rotationally operating this vertical movement operation plate 80 is provided.

The vertical movement operation plate 80 constituting the vertical movement drive mechanism 104 is composed of a vertical movement operation portion 85 in plate form for supporting the magnetic head supporting plate 72 of the magnetic head unit 43 to allow it to undergo vertical movement operation, and a pair of supporting arms 86a, 86b projected from the both end portions of this vertical movement operation portion 85. The vertical movement operation plate 80 is adapted so that support shafts 89 projected on side surfaces of a pair of supporting pieces 87a, 87b formed by raising a portion of the top plate 62 of the holder 42 are supported with respect to pivotal holes 85a bored at the base end portions of the supporting arms 86a, 86b. Further, the vertical movement operation plate 80 is caused to undergo rotational operation, with the support shafts 89 being as the center, in the directions where it becomes close to the top plate 62 and becomes away therefrom of the direction indicated by arrow $Y_1$ and the direction indicated by arrow $Y_2$ in FIG. 6 to thereby rotate the magnetic head supporting plate 72 in the direction indicated by arrow $Y_1$ and in the direction indicated by arrow $Y_2$ in FIG. 6 which are different directions with the support shaft 74 being as center.

Figure 6:
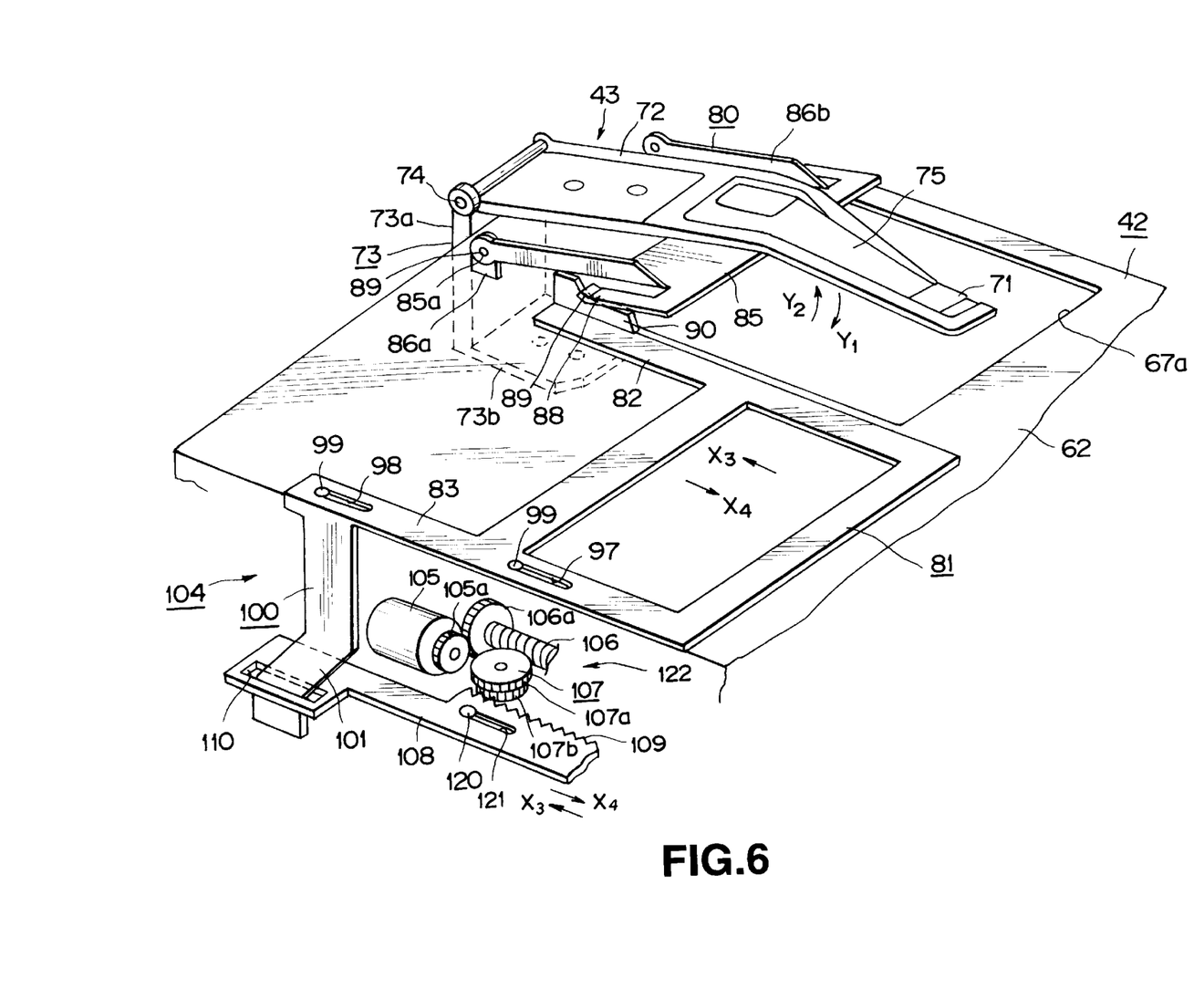
FIG. 6 is a perspective view showing the magnetic head vertical movement device according to this invention.
Figure 7:
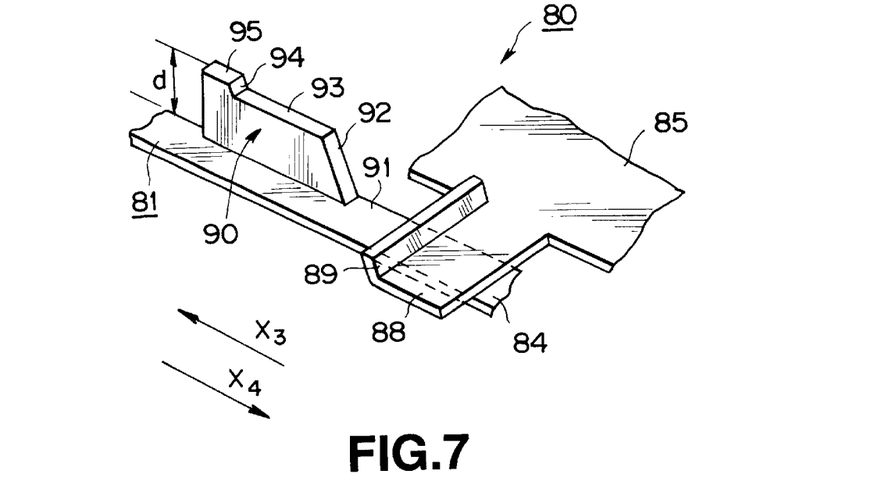
FIG. 7 is a perspective view showing cam portion for controlling vertical movement of magnetic head.

Moreover, as shown in FIGS. 5 and 6, the rotational operation plate 81 includes a rectangular frame portion 84, wherein first and second arm pieces 82, 83 are extended from the both sides of this frame portion 84. At one side of the base end portion side of the first arm piece 82, as shown in FIGS. 5 and 6, there is formed in a rising manner (hereinafter simply referred to as "rising-formed as occasion may demand) the cam portion 90 for carrying out vertical movement operation of the vertical movement operation plate 80 so that the magnetic head 71 is located at the first position, the second position and the third position. As shown in FIG. 7, this cam portion 90 is composed of a first plane surface portion 91 where the magnetic head 71 is caused to be located at first position of the lowermost plane position of the first arm piece 82, a first inclined surface portion 92 inclined in a manner continuous to the first plane surface portion 91, a second plane surface portion 93 formed in a manner continuous to the first inclined surface portion 92 and at which the magnetic head 71 is caused to be located at the second position, a second inclined surface portion 94 inclined in a manner continuous to the second plane surface portion 93, and an uppermost third plane surface portion 95 formed in a manner continuous to the second inclined surface portion 94 and at which the magnetic head 71 is caused to be located at the third position. Accordingly, height d from the first plane surface portion 91 to the third plane surface portion 95 of the cam portion 90 is formed (set) to be height sufficient to carry out vertical movement of the magnetic head 71 within the range between the first position and the third position.

Further, at one side of the base end portion side of the second arm piece 83, there is provided, in a hanging-down manner, a connecting arm 100 disposed at the lower surface side of the base 41 and connected to a slide lever 108 caused to undergo slide operation by the drive motor 105.

As shown in FIGS. 5 and 6, the rotational operation plate 81 constituted as described above is disposed on the top plate 62 of the holder 42 in the state in parallel to the vertical movement operation plate 80 in such a manner that the cam portion 90 is caused to be positioned at the lower surface side of an engagement piece 88 projected at one side of the vertical movement operation plate 80 and the connecting arm 100 is extended toward the lower surface side of the base 41. This rotational operation plate 81 is movably supported in the direction indicated by arrow $X_3$ and in the direction indicated by arrow $X_4$ in FIG. 6 within the range of elongated holes 97, 98 by inserting support shafts 99, 99 vertically provided on the top plate 62 through the elongated holes 97, 98 bored at one side of the frame portion 84 and the second arm piece 83.

In this example, the engagement piece 88 positioned on the cam portion 90 is adapted so that an inclined guide portion 89a which facilitates riding onto the cam portion 90 is provided at one side opposite to respective inclined surfaces 92, 94 of the cam portion 90.

The rotational operation plate 81 disposed on the top plate 62 of the holder 42 in this way is adapted so that when it is slid in the direction indicated by arrow $X_4$ in FIG. 6, the engagement piece 88 of the vertical movement operation plate 80 is moved in order of the first inclined surface portion 92, the second plane surface portion 93, the second inclined surface portion 94 and the third plane surface portion 95 to thereby rotate the vertical movement operation plate 80 in the direction indicated by arrow $Y_2$ in FIG. 6 with the support shafts 89 being as center to elevate the magnetic head 71 from the first position to the third position.

Moreover, when the rotational operation plate 81 is slid in the direction indicated by arrow $X_3$ in FIG. 6 in the state where the engagement piece 88 is positioned on the third plane surface 95 of the cam portion 90, the engagement piece 88 is moved in order of the third plane surface portion 95, the second inclined surface portion 94, the second plane surface portion 93, the first inclined surface portion 92 and the first plane surface portion 91 to thereby rotate the vertical movement operation plate 80 in the direction indicated by arrow $Y_1$ in FIG. 6 with the support shafts 89 being as center to fall the magnetic head 71 from the third position to the first position.

Further, slide operation in the direction indicated by arrow $X_3$ and in the direction indicated by arrow $X_4$ in FIGS. 6 and 7 of the rotational operation plate 81 is carried out by allowing the slide lever 108 to which the connecting arm 100 is connected to undergo slide operation by the drive motor 105.

The slide lever 108 for allowing the rotational operation plate 81 to undergo movement operation is slidably supported in the direction indicated by arrow $X_3$ and in the direction indicated by arrow $X_4$ in FIG. 6 within the range of an elongated hole 121 in such a manner that a support shaft 120 vertically provided on the lower surface side of the base 41 is inserted through the elongated hole 121. This slide lever 108 is caused to undergo slide operation by the drive motor 105 attached at the lower surface side of the base 41. Drive force of the drive motor 105 is transmitted to the slide lever 108 through a connecting gear mechanism 122 which connects a drive gear 105a attached to the drive shaft of the drive motor 105 and a rack gear 109 formed at one side of the slide lever 108. This connection gear mechanism 122 is composed of a worm gear 106 in which a spur gear 106a meshed with the drive gear 105a is formed at the base end portion, and a connection gear 107 in which a bevel gear 107a meshed with the worm gear 106 and a spur gear 107b meshed with the rack gear 109 are coaxially integrally formed.

Figure 8:
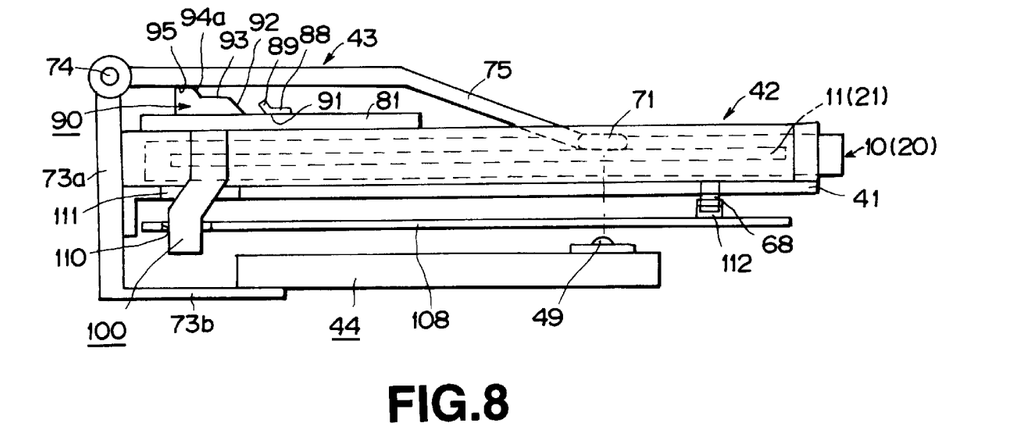
FIG. 8 is a side view showing the state where magnetic head is located at first position where it carries out recording of information signals with respect to disc.

Further, as shown in FIGS. 6 and 8, the connection arm 100 of the rotational operation plate 81 is projected toward the lower surface side of the base 41 through a through-hole 11 formed by cutting a portion of the base 41, and is connected to the slide lever 108 in the state inserted through an engagement hole 110 bored at one end portion of the slide lever 108 as shown in FIG. 6.

In this example, the portion engaged with the engagement hole 110 of the connection arm 100 is caused to be a bent portion 101 as that portion is along the rotational locus of the holder 42 so that the rotational operation plate 81 can be rotated with the support shafts 57 being as center along with the holder 42 while the connection arm 100 maintains the state engaged with the engagement hole 110.

Moreover, at the other end side where the rack gear 109 of the slide lever 108 is formed and in a manner positioned at the side opposite to the side where the rack gear 109 is formed, there is provided a holding portion 112 with which the lock piece 68 provided at the holder 42 is engaged when the holder 42 is rotated toward the cartridge loading portion 45 side. This holding portion 112 is adapted so that when the holder 42 is placed in the state where it is rotated toward the cartridge loading portion 45 side to allow the disc cartridge 10 or 20 to undergo loading with respect to the cartridge loading portion and recording and/or reproduction of information signals can be made with respect to the magneto-optical disc 11 or the optical disc 21, the holding portion 112 serves to lock the holder 42 at the falling position so as to prevent that the holder 42 is rotated in an unprepared manner so that the disc cartridge 10 or 20 is ejected.

Further, the slide lever 108 is adapted so that when the drive motor 105 is rotationally driven, the slide lever 108 is slid in the direction indicated by arrow $X_3$ and in the direction indicated by arrow $X_4$ in FIGS. 5 and 6 through a connection gear mechanism 122 in accordance with the rotational direction of the drive motor 105. When the slide lever 108 is placed in the state where it is moved far most in the direction indicated by arrow $X_4$ in FIGS. 5 and 6, the slide lever 108 allows engagement with respect to the holding portion 112 of the lock piece 68 to be placed in released state so that rotational operation of the holder 42 can be made. In this case, when the eject operation button is operated in the state where the holder 42 is located at the falling position where the disc cartridge 10 or 20 is caused to undergo loading with respect to the cartridge loading portion 45, the holder 42 is rotated toward the rising position side spaced from the cartridge loading portion 45 with the support shafts 57 being as center. Thus, eject operation of the disc cartridge 10 or 20 held within the holder 42 is carried out.

Figure 11:
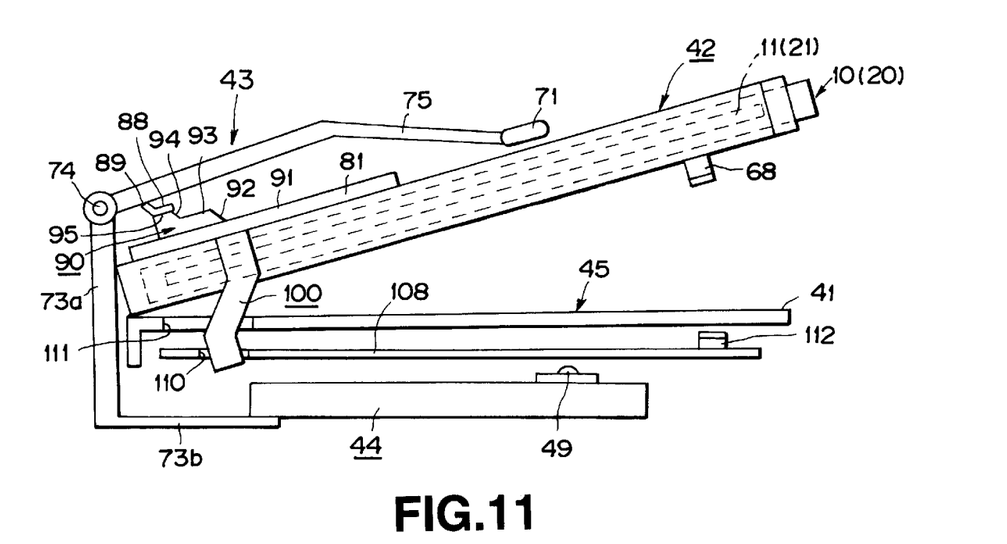
FIG. 11 is a side view when holder is located at rising position where insertion or ejection of disc cartridge is carried out.
Figure 12:
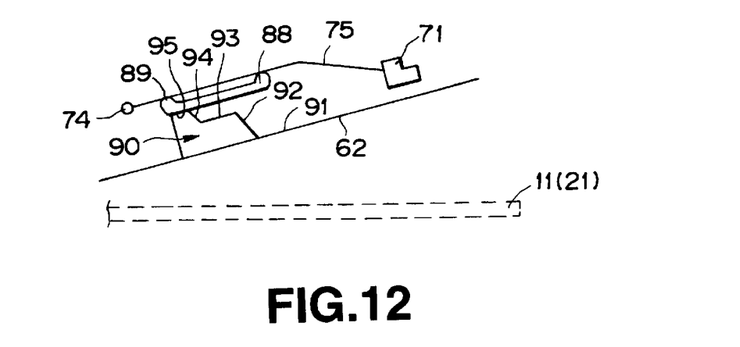
FIG. 12 is a side view showing the relationship between the cam portion and the engagement piece of the rotational operation plate when the magnetic head is located at third position.

At this time, the engagement piece 88 of the rotational operation plate 81 is positioned on the third flat plane surface portion 95 of the cam portion 90 and the head supporting plate 72 of the magnetic head unit 43 is rotated in the direction indicated by arrow $Y_2$ in FIG. 6 with the support shaft 74 being as center to place the magnetic head 71 at the third position where the magnetic head 71 has been moved to the uppermost position of the holder 42 as shown in FIGS. 11 and 12.

Since the magnetic head 71 can be greatly moved in the upper direction of the holder 42 when the holder 42 is located at the rising position where insertion or ejection of the disc cartridge 10 or 20 is carried out as stated above, it is securely prevented that the disc cartridge 10 or 20 comes into contact with the magnetic head 71 at the time of insertion or. at the time of ejection with respect to the holder 42 of the disc cartridge 10 or 20, thus making it possible to realize protection of the magnetic head 71.

The operation in which the disc cartridge 10 or 20 is loaded into the magneto-optical recording/reproducing apparatus (unit) provided with configuration as described above to control vertical movement position with respect to the magneto-optical disc 11 or the optical disc 21 of the magnetic head unit 43 in accordance with the state where recording and/or reproduction of information signals is carried out with respect to the magneto-optical disc 11 or the optical disc 21 will now be described.

Initially, in order to carry out recording and/or reproduction of information signals with respect to the magneto-optical disc 11 or the optical disc 21, the holder 42 is caused to undergo rotational operation to place it at the rising position spaced from the cartridge loading portion 45. At this time, the cartridge insertion/withdrawal hole 61 of the holder 42 is placed in the state faced toward the external of the unit body. In this case, the disc cartridge 10 or 20 is inserted into the holder 42 through the cartridge insertion/withdrawal hole 61, and is caused to be held therewithin. At this time, the magnetic head 71 is placed (located) at the third position where it has been greatly moved toward the upper direction of the holder 42 as shown in FIGS. 11 and 12.

At the time point when the holder 42 is caused to hold the disc cartridge 10 or 20, the holder 42 is rotated toward the cartridge loading portion 45 side with the support shafts 57 being as the center to allow the disc cartridge 10 or 20 to undergo loading with respect to the cartridge loading portion 45 after undergone positioning.

In this case, when it is detected by the detection switch that the disc cartridge 10 or 20 is loaded with respect to the cartridge loading portion 45, the drive motor 105 constituting the vertical movement drive mechanism 104 is driven in the forward rotation direction to slide the slide lever 108 by fixed distance in the direction indicated by arrow $X_3$ in FIG. 6 to allow the lock piece 68 of the holder 42 to be engaged with the holding portion 112 to lock the holder 42 at the loading position of the disc cartridge 10 or 20.

Figure 10:
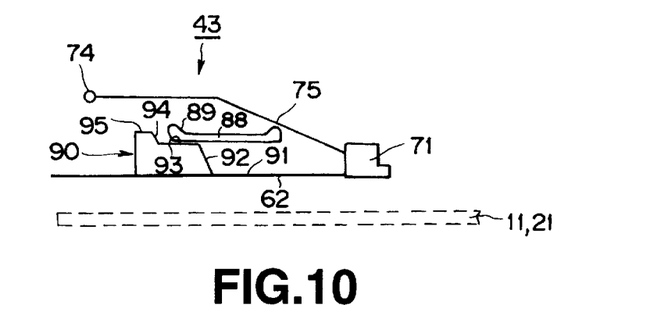
FIG. 10 is a side view showing the relationship between the cam portion and the engagement piece of the rotational operation plate when the magnetic head is located at the second position.

At this time, the engagement piece 88 of the rotational operation plate 81 is positioned on the second plane surface portion 93 of the cam portion 90 and the head supporting plate 72 of the magnetic head unit 43 is rotated in the direction indicated by arrow $Y_1$ in FIG. 6 with the support shaft 74 being as the center thus to place (locate) the magnetic head 71 at the second position, shown in FIG. 10, close to the magneto-optical disc 11 or the optical disc 21 relative to the third position.

Figure 9:
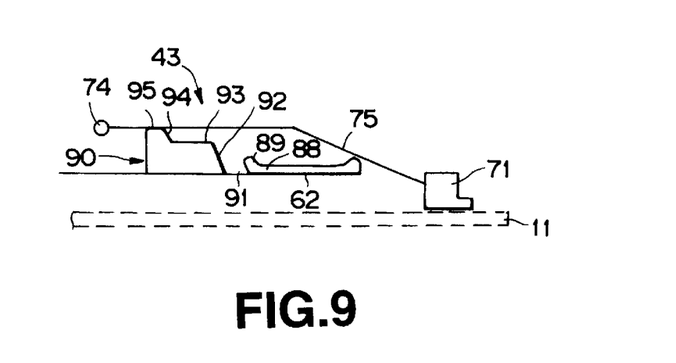
FIG. 9 is a side view showing the relationship between cam portion and engagement piece of rotational operation plate when the magnetic head is located at the first position.

In this case, when it is detected that disc cartridge 10 loaded with respect to the cartridge loading portion 45 is disc cartridge within which the magneto-optical disc 11 is accommodated and the recording button is operated so that the recording operation mode is selected, the drive motor 105 is driven in the forward rotation direction. As a result, the slide lever 108 is slid by fixed distance in the direction indicated by arrow $X_3$ in FIG. 6. Thus, the rotational operation plate 81 in which connection arm 100 is connected to the slide lever 108 is also slid in the direction indicated by arrow $X_3$ in FIG. 6, so the engagement piece 88 of the vertical movement operation plate 80 which has been mounted on the second plane surface portion 93 of the cam portion 90 is moved onto the first plane surface portion 91. When the engagement piece 88 is moved from the second plane surface portion 93 to the first plane surface portion 91, the vertical movement operation plate 80 is rotated in the direction indicated by arrow $Y_1$ in FIG. 6 with the support shafts 89 being as the center. As a result, the magnetic head supporting plate 72 supported on the vertical movement operation portion 85 of the vertical movement operation plate 80 undergoes biasing force of the leaf spring 75 so that it is rotated in the direction indicated by arrow $Y_1$ in FIG. 6. In addition, the magnetic head 71 attached to the front end of the magnetic head supporting plate 72 is fallen, as shown in FIGS. 8 and 9, down to the first position, at which recording of information signals can be made, close to the magneto-optical disc 11 in a manner substantially in contact therewith. At this time, the magnetic head 71 undergoes biasing force of the leaf spring 75 so that it is in contact with the magneto-optical disc 11 at a constant contact pressure.

In this example, when the recording operation mode is selected, the disc rotational operation mechanism 2 starts driving to allow the magneto-optical disc 11 clamped on the disc table 47 to undergo rotational operation in one body with the disc table 47.

In this case, the optical pick-up unit 44 is driven to apply, to the magneto-optical disc 11, external magnetic field modulated in accordance with information signal to be recorded from the magnetic head 71 while scanning the signal recording area of the magneto-optical disc 11 by light beams emitted from the light source. Thus, desired information recording is carried out.

When recording of information signals is completed and the stop button is operated so that the recording operation mode is stopped, the drive motor 105 is driven in the backward (reverse) rotation direction. As a result, the slide lever 108 is slid by a fixed distance in the direction indicated by arrow $X_4$ in FIG. 6 and the rotational operation plate 81 is also slid in the direction indicated by arrow $X_4$ in FIG. 6. Thus, the engagement piece 88 of the vertical movement operation plate 80 which has been mounted on the first plane surface portion 91 of the cam portion 90 begins riding on the first inclined surface portion 92 and is moved onto the second plane surface portion 93. When the engagement piece 88 is moved from the first plane surface portion 91 to the second plane surface portion 93, the vertical movement operation plate 80 is rotated in the direction indicated by arrow $Y_2$ in FIG. 6 with the support shafts 89 being as the center. As a result, the magnetic head supporting plate 72 supported on the vertical movement operation portion 85 of the vertical movement operation plate 80 is rotated in the direction indicated by arrow $Y_2$ in FIG. 6 against biasing force of the leaf spring 75. Thus, the magnetic head 71 attached to the front end of the magnetic head supporting plate 72 is raised to the second position spaced from the magneto-optical disc 11 as shown in FIG. 10.

Moreover, when the disc cartridge 10 within which the magneto-optical disc 11 is accommodated or the disc cartridge 20 within which the reproduction only type optical disc 21 is accommodated is loaded with respect to the cartridge loading portion 45, and the reproduction button is operated so that the reproduction operation mode is selected, application of external magnetic field is not required. Namely, read operation of information signals recorded on the magneto-optical disc 11 and the optical disc 21 is carried out by scanning the signal recording surface of the magneto-optical disc 11 or the optical disc 21 by light beams emitted from the optical pick-up unit 44 to detect light beams reflected from the signal recording surface of the magneto-optical disc 11 or the optical disc 21 by light (photo-) detector provided at the optical pick-up unit 44. Accordingly, no external magnetic field is required for reproduction of information signals.

In view of the above, when the reproduction mode is selected, the drive motor 105 is driven and controlled in the forward rotation direction or in the backward rotation direction. Thus, position of the slide lever 108 is controlled so that the engagement piece 88 of the vertical movement operation plate 80 is positioned on the second plane surface portion 93 of the cam portion 90. Since the engagement piece 88 of the vertical movement operation plate 80 is positioned on the second plane surface portion 93 of the cam portion 90, the magnetic head 71 is held at the spaced second position where it is not slidably in contact with the magneto-optical disc 11 or the optical disc 21 as shown in FIG. 10. By allowing the magnetic head 71 to be spaced from the magneto-optical disc 11 or the optical disc 21 so that it does not come into slidable contact therewith at the time of reproduction mode where application of external magnetic field is not required as stated above, abrasion of the magnetic head 71 can be held down to the minimum level.

The second position where the magnetic head 71 is spaced from the magneto-optical disc 11 or the optical disc 21 may be position where the magnetic head 71 is not in contact with at least the magneto-optical disc 11 or the optical disc 21. In this example, the second position of the magnetic head 71 is the position substantially in correspondence with the top plate 62 of the cartridge holder 42.

Moreover, in order to eject the disc cartridge 10 or 20 loaded with respect to the cassette loading portion 45, the stop button is operated, the magneto-optical recording/reproducing unit is caused to be in stop mode, and the eject button is operated. When the eject button is operated, the drive motor 105 constituting the vertical movement drive mechanism 104 is driven in the backward (reverse) rotation direction to slide the slide lever 108 in the direction indicated by arrow $X_4$ in FIG. 6. When the slide lever 108 is slid in the direction indicated by arrow $X_4$ in FIG. 6, the engagement piece 88 of the rotational operation plate 81 positioned on the first or second plane surface portion 91 or 93 of the cam portion 90 rides on the first and second inclined surface portions 92 and 94 in succession, and is moved onto the third horizontal portion 95 as shown in FIGS. 11 and 12. When the engagement piece 88 is moved onto the third horizontal portion 95, the vertical movement operation plate 80 is rotated in the direction indicated by arrow $Y_2$ in FIG. 6 with the support shafts 89 being as the center. As a result, the magnetic head supporting plate 72 supported on the vertical movement operation portion 85 of the vertical movement operation plate 80 is rotated in the direction indicated by arrow $Y_2$ in FIG. 6 with the support shaft 74 being as the center against biasing force of the leaf spring 75. Thus, as shown in FIGS. 11 and 12, the magnetic head 71 attached to the front end of the magnetic head supporting plate 72 is moved to the third position further above the second position and above the top plate 62 withdrawn from the portion within the holder 42.

When the slide lever 108 is slid in the direction indicated by arrow $X_4$ in FIG. 6 up to the position where the engagement piece 88 of the rotational operation plate 81 rides on the third horizontal portion 95 of the cam portion 90, engagement of the lock piece 68 which has been engaged with the holding portion 112 is released. As a result, lock state of the holder 42 is released. Thus, the holder 42 is placed in the state where it can be rotated in an upper direction of the direction to away from the cartridge loading portion 45 with the support shafts 57 being as the center. When the holder 42 is rotated in upper direction of the direction to away from the cartridge loading portion 45 with the support shafts 57 being as the center along with the cover body which covers the holder 42, the disc cartridge 10 or 20 held within the holder 42 is projected toward the external of the holder 42 through the cartridge insertion/withdrawal hole 61 by eject mechanism (not shown). The disc cartridge 10 or 20 is ejected from the holder 42 by grasping or gripping the portion projected from the cartridge insertion/withdrawal hole 61 to pull it.

In this example, when it is detected that the slide lever 108 has been moved up to the position where the engagement piece 88 of the rotational operation plate 81 rides on the third horizontal portion 95 of the cam portion 90, drive of the drive motor 105 is stopped.

Since when the holder 42 is moved to the rising position where insertion/withdrawal of the disc cartridge 10 or 20 spaced from the cartridge loading portion 45 is carried out, the magnetic head 71 is moved to the third position further above the second position spaced from the magneto-optical disc 11 or the optical disc 21 located when (operation mode of) the recording and/or reproduction unit is in the non-recording state where recording of information signals is not carried out, collision between the magnetic head 71 and the disc cartridge 10 or 20 can be securely prevented at the time of insertion or ejection with respect to the holder 42 of the disc cartridge 10 or 20. Thus, protection of the magnetic head 71 and the disc cartridges 10, 20 can be realized.

While explanation has been given by taking the example where this invention is applied to the magneto-optical recording/reproducing apparatus using, as recording medium, both the magneto-optical disc 11 which permits recording of information signals and the reproduction only type optical disc, this invention may be applied to a recording type magneto-optical recording apparatus using, as a recording medium, only the magneto-optical disc 11 which permits recording of information signals.

Further, the recording medium used in the magneto-optical recording and/or reproducing apparatus is not limited to the magneto-optical disc or the optical disc accommodated within the disc cartridge, but may be recording medium loaded with respect to the apparatus body as the disc itself and may be magneto-optical disc or optical disc constituted so that it is held within holding body such as disc tray, etc.

In addition, the magnetic head may be magnetic head of the non-contact type in which there is no possibility that it comes into contact with the disc at the time of recording of information signals.

INDUSTRIAL APPLICABILITY

As described above, since the magnetic head vertical movement device for the magneto-optical recording and/or reproducing apparatus according to this invention is of the structure in which when the holder is located at the rising position where insertion or ejection of the recording medium is carried out, the magnetic head is caused to be moved to the position further above the position when (operation mode of) the recording and/or reproduction unit is in the non-recording state with respect to the recording medium, it is possible to securely prevent the recording medium from being in contact with the magnetic head at the time of insertion or ejection of the recording medium with respect to the holder. Thus, reliable protection of the magnetic head can be realized.

In addition, since when the holder is located at the falling position where recording and/or reproduction of information signals are carried out with respect to the recording medium, the magnetic head is vertically moved only within the range between the first position close to the recording medium where recording of information signals is carried out with respect to the recording medium and the second position located when (operation mode of) the recording and/or reproduction unit is in the non-recording state with respect to the recording medium, which is close to the recording medium relative to the position where insertion or ejection of the recording medium with respect to the holder is carried out, the vertical movement distance of the magnetic head can be reduced. Accordingly, thin thickness structure of the magneto-optical recording and/or reproducing apparatus is realized. Thus, it is possible to realize that the apparatus itself is caused to become compact.

What is claimed is:

1. A magnetic head vertical movement device for a magneto-optical recording and/or reproducing apparatus, the magnetic head vertical movement device comprising:
   a holder for permitting holding of a recording medium, and adapted to be moved between a rising position where insertion or ejection of the recording medium is carried out and a falling position where recording and/or reproduction are carried out;
   a recording and/or reproduction unit including a magnetic head above the holder and an optical head disposed at a position opposite to the magnetic head; and
   a vertical movement drive mechanism for the magnetic head, which carries out vertical movement of the magnetic head within a range between a first position where the magnetic head is caused to carry out recording of information signals with respect to the recording medium along with the optical head when the holder is located at the falling position, a second position above the first position and substantially flush with the upper surface of the holder, at which the magnetic head is located when the recording and/or reproduction unit is in a non-recording state with respect to the recording medium, and a third position above the second position, at which the magnetic head is located when the holder is located at the rising position.

2. A magnetic head vertical movement device for a magneto-optical recording and/or reproducing apparatus as set forth in claim 1,
   wherein the vertical movement drive mechanism is adapted so that when the recording and/or reproduction unit is placed in stopped state or in reproduction state, it moves the magnetic head to the second position, and when the holder is moved to the rising position, it moves the magnetic head to the third position.

3. A magnetic head vertical movement device for a magneto-optical recording and/or reproducing apparatus as set forth in claim 2,
   wherein the vertical movement drive mechanism comprises a cam portion for moving the magnetic head to the first to third positions.

4. A magnetic head vertical movement device for a magneto-optical recording and/or reproducing apparatus as set forth in claim 3,
   wherein the vertical movement drive mechanism further comprises a drive portion for driving the cam portion.

5. A magnetic head vertical movement device for a magneto-optical recording and/or reproducing apparatus as set forth in claim 2,
   wherein the holder comprises an opening portion into which the magnetic head is inserted, and the magnetic head is inserted into the holder by the vertical movement drive mechanism from the opening portion.

6. A magnetic head vertical movement device for a magneto-optical recording and/or reproducing apparatus as set forth in claim 5,
   wherein the first position is a position where the magnetic head inserted from the opening portion of the holder is in contact with the recording medium.

7. A magnetic head vertical movement device for a magneto-optical recording and/or reproducing apparatus, the magnetic head vertical movement device comprising:
   a holder for permitting holding of a recording medium, and adapted to be moved between a rising position where insertion or ejection of the recording medium is carried out and a falling position where recording and/or reproduction are carried out;
   a recording and/or reproduction unit including a magnetic head above the holder and an optical head disposed at a position opposite to the magnetic head; and a vertical movement drive mechanism for the magnetic head, which carries out vertical movement of the magnetic head within a range between a first position where the magnetic head is caused to carry out recording of information signals with respect to the recording medium along with the optical head when the holder is located at the falling position, a second position above the first position, at which the magnetic head is located when the recording and/or reproduction unit is in a non-recording state with respect to the recording medium, and a third position above the second position, at which the magnetic head is located when the holder is located at the rising position, wherein the vertical movement drive mechanism comprises a cam portion for moving the magnetic head within the range between the first, second and third positions, a drive portion for driving the cam portion, and a vertical movement operation member provided with the cam portion and slidably attached on the upper surface of the holder, and wherein the drive portion comprises a slider engaged with the vertical movement operation member and wherein the vertical movement drive mechanism is adapted so that when the recording and/or reproduction unit is placed in a stopped state or a reproduction state, it moves the magnetic head to the second position, and when the holder is moved to the rising position, it moves the magnetic head to the third position.

8. A magnetic head vertical movement device for a magneto-optical recording and/or reproducing apparatus using a disc cartridge within which a magneto-optical disc is accommodated, the magnetic head vertical movement device comprising:

a holder adapted for holding the disc cartridge to be inserted and adapted so that it is rotated between a rising position where insertion or ejection of the disc cartridge is carried out and a falling position where recording and/or reproduction are carried out with respect to the magneto-optical disc within the disc cartridge;

a recording and/or reproduction unit including a magnetic head disposed above the holder and an optical head disposed at a position opposite to the magnetic head; and a vertical movement drive mechanism for the magnetic head, which carries out vertical movement of the magnetic head within a range between a first position where the magnetic head is caused to carry out recording of information signals with respect to the magneto-optical disc along with the optical head when the holder is located at the falling position, a second position above the first position and substantially flush with the upper surface of the holder, at which the magnetic head is located when the recording and/or reproduction unit is in a non-recording state with respect to the recording medium, and a third position above the second position, at which the magnetic head is located when the holder is located at the rising position.

9. A magnetic head vertical movement device for a magneto-optical recording and/or reproducing apparatus as set forth in claim 8, wherein the vertical movement drive mechanism comprises a movement member movably provided on the upper surface side of the holder to move the magnetic head to the first to third positions, and a drive portion for driving the movement member.

10. A magnetic head vertical movement device for a magneto-optical recording and/or reproducing apparatus as set forth in claim 9, wherein the holder comprises an opening portion into which the magnetic head is inserted, and the magnetic head is inserted into the holder by the vertical movement drive mechanism from the opening portion.

11. A magnetic head vertical movement device for a magneto-optical recording and/or reproducing apparatus as set forth in claim 10, wherein the first position is a position where the magnetic head inserted from the opening portion of the holder is in contact with the recording medium.

12. A magnetic head vertical movement device for a magneto-optical recording and/or reproducing apparatus as set forth in claim 9, wherein the movement member is provided with a cam portion in a stair-step form for moving stepwise the first, second and third positions.

13. A magnetic head vertical movement device for a magneto-optical recording and/or reproducing apparatus as set forth in claim 8, wherein the vertical movement drive mechanism is adapted so that when the recording and/or reproduction unit is in stopped state or in reproduction state, it moves the magnetic head to the second position, and when the holder is moved to the rising position, it moves the magnetic head to the third position.

* * * * *